United States Patent [19]
Otani et al.

[11] 3,981,955
[45] Sept. 21, 1976

[54] METHOD OF ROTATIONAL MOLDING REINFORCER-INCORPORATED PLASTICS

[75] Inventors: Yasuhiko Otani; Setsuo Imada, both of Kobe, Japan

[73] Assignee: Kobe Steel Ltd., Kobe, Japan

[22] Filed: Oct. 23, 1973

[21] Appl. No.: 408,528

[30] Foreign Application Priority Data
Oct. 21, 1972   Japan.............................. 47-105570

[52] U.S. Cl.............................. 264/255; 264/310; 264/311; 264/DIG. 53
[51] Int. Cl.².......................................... B29C 5/04
[58] Field of Search .... 264/255, 310, 311, DIG. 53, 264/114, 125, 126, 128, 112

[56] References Cited
UNITED STATES PATENTS

| | | | |
|---|---|---|---|
| 2,862,806 | 12/1958 | Nestor | 264/311 |
| 2,948,651 | 8/1960 | Waag | 264/255 |
| 3,184,368 | 5/1965 | Juras | 264/126 |
| 3,368,013 | 2/1968 | Pisciotta et al. | 264/125 |
| 3,391,823 | 7/1968 | Tijms | 264/311 |
| 3,555,142 | 1/1971 | Haener | 264/311 |
| 3,660,547 | 5/1972 | Ruekberg | 264/24 |
| 3,714,312 | 1/1973 | Nitta et al. | 264/114 |

*Primary Examiner*—Robert F. White
*Assistant Examiner*—T. E. Balhoff
*Attorney, Agent, or Firm*—Oblon, Fisher, Spivak, McClelland & Maier

[57] ABSTRACT

A method for preparing reinforcer-incorporated plastic molded articles by rotational molding which includes moving a reinforcer and a binder of an amount smaller than the amount of reinforcer along the inner wall of a rotary mold to thereby form in advance a layer of reinforcer which is fixed on the inner side of the mold and having a large number of fine voids, feeding a liquid matrix into the rotary mold and impregnating the liquid matrix into the layer of reinforcer, and solidifying the matrix impregnated in the reinforcer in the rotary mold.

8 Claims, 11 Drawing Figures

METHOD OF ROTATIONAL MOLDING REINFORCER-INCORPORATED PLASTICS

BACKGROUND OF THE INVENTION

1. Field of the Invention

The present invention relates to a method of preparing molded articles and more particularly to a method of preparing molded plastic articles incorporated with reinforcers such as glass fibers and carbon fibers by rotational molding and to molded articles prepared by this molding method.

2. Description of the Prior Art

High strength is required of plastic molded articles, and in order to satisfy this requirement, various reinforcers have been incorporated into plastics. It may be considered that a higher strength can be expected by increasing the ratio of the incorporated reinforcer to the total molding material. However, in the conventional rotational molding methods, because of problems involved in the manufacturing steps, the maximum ratio of reinforcer to be incorporated is limited and hence, sufficient improvement of the mechanical strength cannot be attained.

Molded articles of reinforcer-incorporated plastics such as thermoplastic resins and thermosetting resins have been known in the art, and hand lay-up method, spray-up method, press method, injection method and the like are well known as methods for preparing these molded articles.

There also is well known a method for preparing molded articles of various plastics which comprises placing a powdery resin into a rotary mold, revolving the mold by 360°, disposing a heating furnace and a cooling chamber in this order in the revolution passage of the mold, dispersing the powdery resin uniformly on the inner face of the mold by the bi-axial rotation of the mold in the heating furnace and cooling chamber, melting the powdery resin in the heating furnace to fuse-mold the resin on the inner face of the mold, and cooling and solidifying the molded resin in the cooling chamber. In order to obtain a reinforcer-incorporated plastic molded article according to this rotational molding method, a powdery or liquid thermoplastic or thermosetting resin incorporated with a reinforcer such as glass fibers and carbon fibers is placed into a rotary mold, such as mentioned above, and rotational molding is carried out. Because of such factors as change in the viscosity of the entire resin composition, the intended configuration to be attained in the mold, and the like, the ratio of the reinforcer to be incorporated should be inevitably limited and uniform dispersion of the reinforcer in the entire composition cannot be obtained. Therefore, it is virtually impossible to obtain a molded article having sufficient strength, and especially when the configuration of the mold is complicated, it frequently occurs that the resin incorporated sufficiently with the reinforcer is not distributed into small and fine portions of the mold and it is difficult to obtain a complete product.

As means for overcoming the foregoing defects, there has been proposed a method in which a reinforcer such as glass fibers is tightly bound, the tightly bound reinforcer is incorporated into a thermosetting liquid resin such as unsaturated polyesters and the resulting resin composition is subjected to bi-axial rotational molding.

This method has been created with a view to overcoming the following disadvantages brought about when a reinforcer, not tightly bound, is incorporated in a liquid resin and the resin composition is subjected to rotational molding. Namely, in such case, a gathering agent used for gathering individual filaments having a diameter of several microns is dissolved in the liquid resin, and since the amount of gathering agent is small, the gathering force is very low. Therefore, when mechanical forces are applied to the reinforcer during the rotational molding conducted under agitational mixing, the reinforcer composed of several hundreds of individual filaments having a diameter of several microns is entangled and individual filaments form cotton-like masses, with the result that it is virtually impossible to obtain molded articles having a uniform thickness.

As regards the mechanical strength of molded articles, results of various experiments teach that highest strength can be obtained when the reinforcer is disentangled, and decrease in the degree of disentanglement in the reinforcer results in reduction of the mechanical strength of the product. Therefore, in conducting the above known rotational molding method, it is necessary to allow the reinforcer to be disentangled within such a range as will not damage the moldability of the starting resin composition.

In case 20 parts of glass fibers are incorporated in 100 parts of an unsaturated polyester resin (the reinforcer content being 16.5 percent by weight), the flexural strength of a molded article prepared from the disentangled reinforcer is 12 to 14 Kg/mm$^2$, but the flexural stress of a molded product obtained according to the above rotational molding method using the tightly bound reinforcer is only 7 Kg/mm$^2$ at highest and if it is intended to obtain a high strength, the inner face of the molded article, namely the face not contacted with the mold, has such irregularities that molding becomes impossible.

Further, according to the above method, with increase in the amount of reinforcer incorporated, the viscosity of the starting composition of the resin and the reinforcer is extremely increased, and hence, the starting composition does not adhere on the inner wall of the mold but forms free solid masses.

In view of the foregoing, the maximum allowable amount of reinforcer to be incorporated in the resin is about 30 parts per 100 parts of resin in the conventional methods (the maximum reinforcer content in the starting resin composition being about 23% by weight).

SUMMARY OF THE INVENTION

It is therefore a primary object of this invention to provide a method for preparing plastic molded articles having a high strength by increasing the ratio of reinforcer to be incorporated.

Another object of this invention is to provide a method for preparing plastic molded articles in which a reinforcer is uniformly dispersed.

A further object of this invention is to provide a method for preparing plastic molded articles in which both the inner surface and the outer surface are smooth.

A still further object of this invention is to provide molded articles prepared by the foregoing methods.

The foregoing and other objects of this invention can be attained by a method for preparing reinforcer-incorporated plastic molded article by rotational molding, which includes moving a reinforcer and a binder of an amount smaller than the amount of the reinforcer along the inner wall of a rotary mold to thereby form, in advance, a layer of the reinforcer which is fixed on the inner side of the mold and has a great number of fine voids, feeding a liquid matrix into the rotary mold and impregnating the liquid matrix into the layer of the reinforcer, and solidifying the matrix impregnated in the reinforcer layer in the rotary mold.

The above-mentioned layer of reinforcer having a great number of fine voids is formed while a larger amount of the reinforcer and a smaller amount of a powdery binder are moved along the inner wall of a rotary mold. By the terms "larger amount" and "small amount" used herein are meant only amounts of the reinforcer and binder that are present in the rotary mold in the free movable state. In other words, if a layer of reinforcer and binder fixed to the inner wall of the rotary mold is already formed, amounts of the reinforcer and binder in such fixed layer are not included into said larger amount and smaller amount.

In the layer having a great number of voids, when the reinforcer is a fibrous material, it is present in the fluffy state or overlapped state on the inner wall of the mold or on a resin layer formed on the inner wall of the mold. The binder exhibits a viscosity which varies depending on the temperature and other conditions in the mold and adheres the reinforcer fibers to each other or adheres them to the mold or the resin layer formed on the mold. Thus, the reinforcer is bonded and adhered. The binder can be introduced into the mold after it has been applied to a part of the reinforcer, but if the binder is introduced into the mold together with the reinforcer, while keeping it in the powdery state, at least at the time of introduction into the mold, the reinforcer layer having a great number of fine voids can be formed more effetively. It is one of the objects of this invention to form effectively such a layer of the reinforcer having a great number of fine voids. In order to attain this object, it is preferred that a thermoplastic resin is employed as the binder, and especially good results can be obtained when polyethylene is employed. The matrix to be impregnated into the reinforcer layer and then solidified should have such properties that the matrix can be well permeated into fine voids of the reinforcer layer. The matrix is liquid at least when it is brought into contact with the reinforcer layer, it has a good compatibility with either the reinforcer or the binder, and it can be solidified in the state containing the reinforcer therein. It is also one of the objects of this invention to solidify the matrix in the state containing compactly the reinforcer. For attaining this object it is effective to employ a thermosetting resin, especially an unsaturated polyester, as the matrix.

Although the foregoing explanation has been given mainly by reference to the fibrous reinforcer, the objects of this invention can be fully attained also by employing a flaky reinforcer.

Although the term rotational molding is used throughout, it is to be understood that centrifugal casting is also encompassed as an exemplary form of such rotational molding.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 2b is an enlarged fragmentary view of a wall portion of FIG. 2a;

FIG. 3b is an enlarged fragmentary view of a wall portion of FIG. 3a; and

DETAILED DESCRIPTION OF PREFERRED EMBODIMENTS

Figure 1:
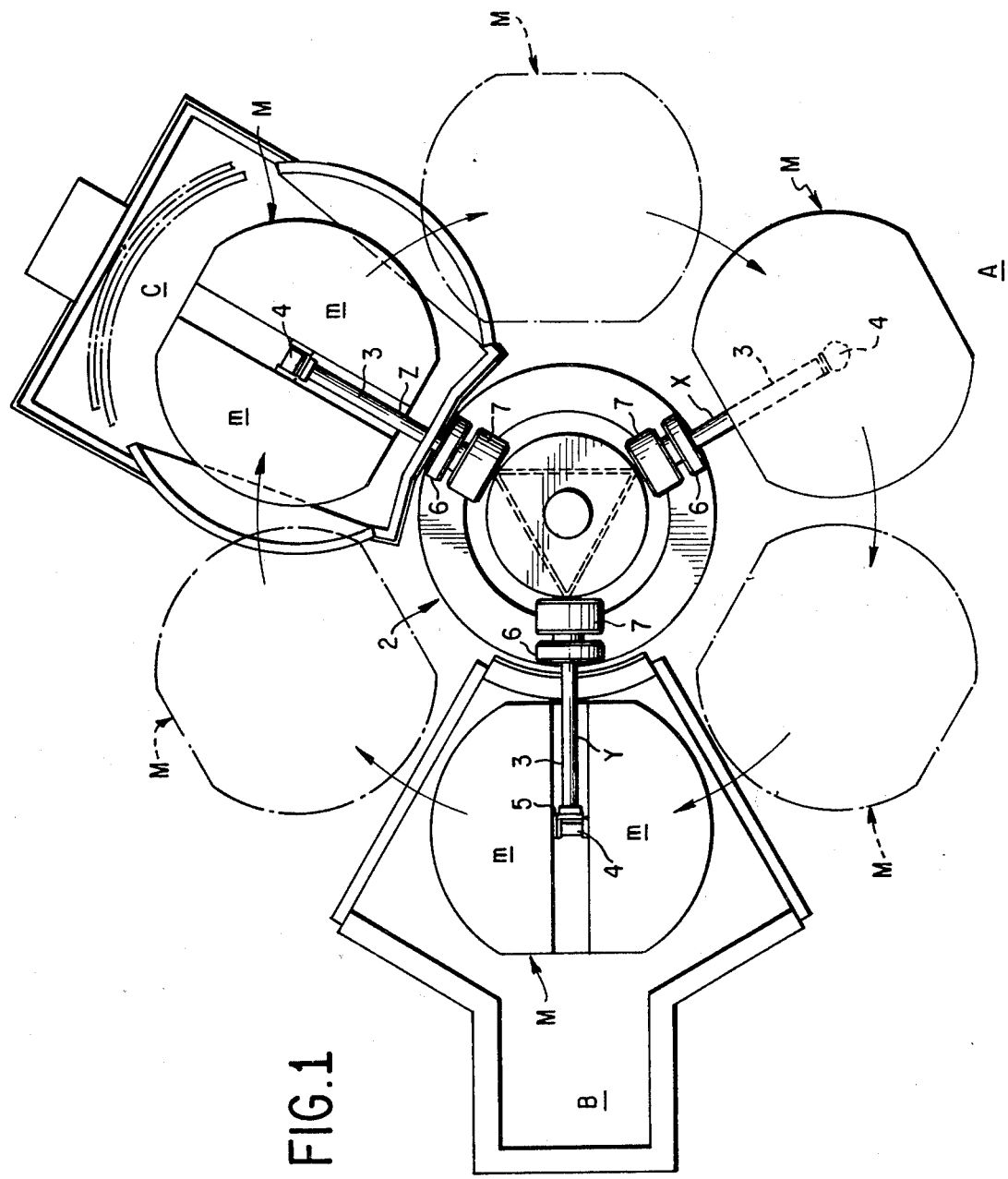
FIG. 1 is a plan view illustrating one embodiment of the apparatus to be used for practising the rotational molding method according to this invention.
Figure 2A:
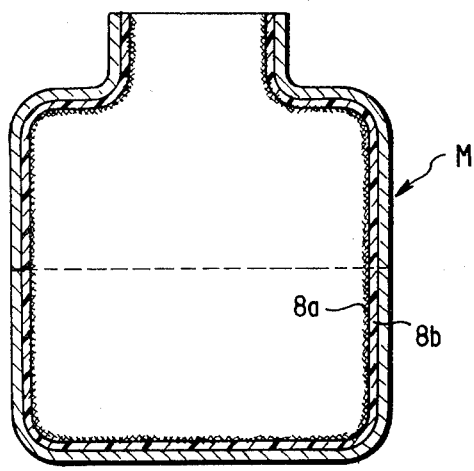
FIGS. 2a, 2c and 2d illustrate the steps of one embodiment of the method of this invention.
Figure 2B:
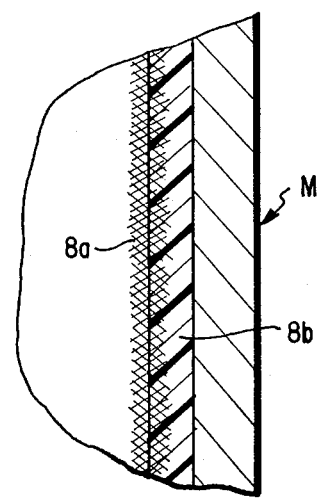
Figure 2C:
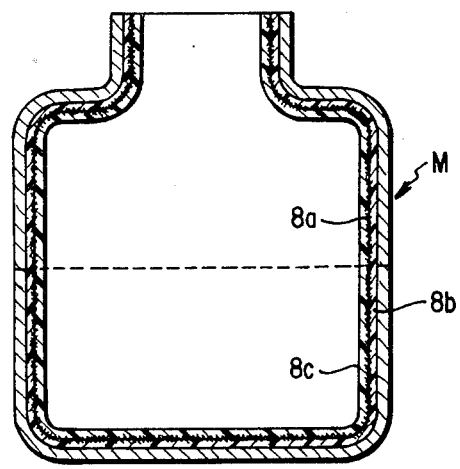
Figure 2E:
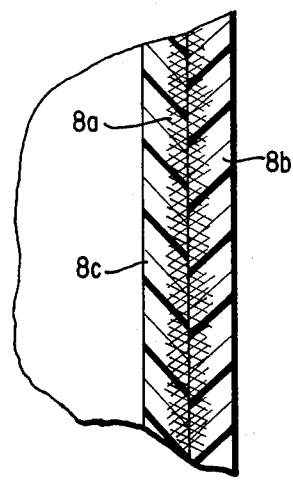
FIG. 2e is an enlarged fragmentary view of a wall portion of FIG. 2d.
Figure 2D:
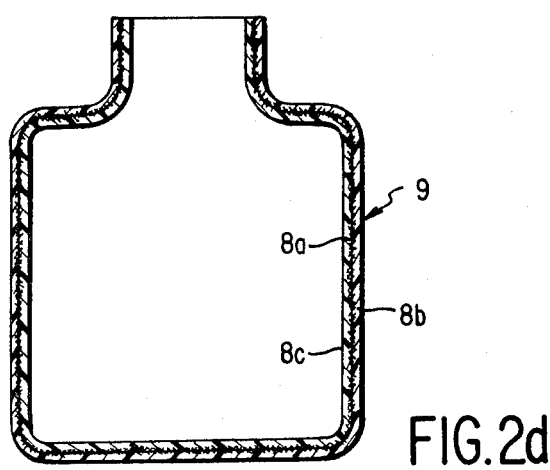
Figure 3A:
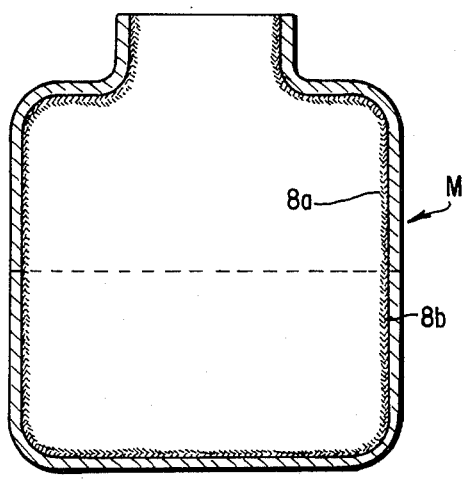
FIGS. 3a, 3c and 3d illustrate the steps of another embodiment of the method of this invention.
Figure 3B:
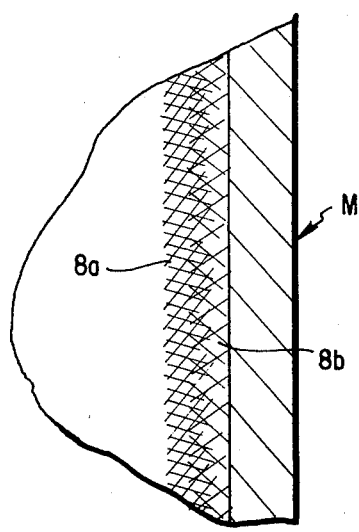
Figure 3C:
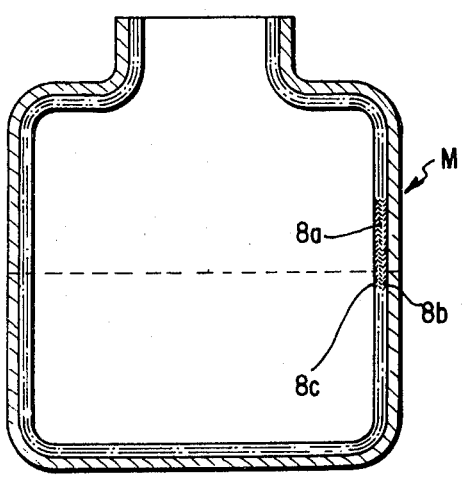
Figure 3E:
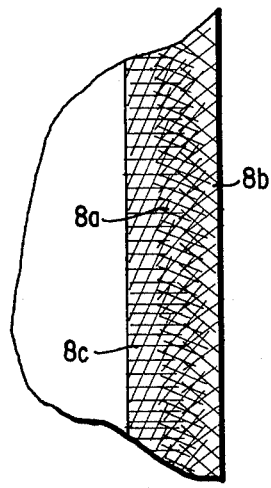
FIG. 3e is an enlarged fragmentary view of a wall portion of FIG. 3d.
Figure 3D:
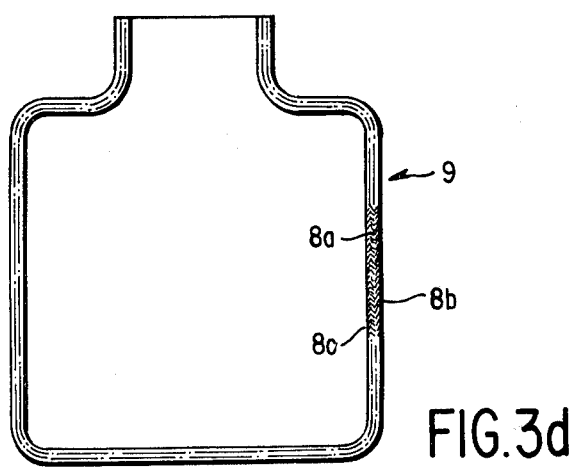

FIG. 1 illustrates an embodiment of the rotational molding apparatus to be used for practice of the method of this invention. In FIG. 1, reference symbol A indicates a station for mounting and dismounting rotary molds, at which a rotary mold M is mounted and a mold M containing a molded article therein is dismounted, and reference symbol B indicates a heating furnace station. While the mold M is passed through station B, it is heated while being rotated and a packed resin including a reinforcer, as mentioned above, is melted and adheres on the inner face of the mold in the form of a layer. Reference symbol C designates a cooling chamber station mounted to cool the mold heated in the heating furnace station B to thereby cool and solidify the molded resin article. The mold is passed through station C while being rotated during which the mold M is cooled. As illustrated in FIG. 1, these three stations are disposed in an equilateral triangle form with a distance of 120° between every two adjacent stations, and mold supports X, Y and Z are disposed similarly equidistantly with a distance of 120° between every two adjacent supports, on a turntable 2 revolved about a central shaft 1 as a fulcrum. Each of the supports carries a pair of mold parts $m$ and $m$, and these supports are rotated intermittently in regular succession so that the operations of dismounting and mounting molds at the station A, heat-melting and molding the resin containing a reinforcer in the state dispersed therein at the station B and cooling molds at the station C can be performed successively.

Each of said supports X, Y and Z for molds M has a double shaft 3 composed of an inner shaft erected on the turntable 2 and an outer shaft covering the inner shaft. A pair of mold parts $m$ and $m$ are supported on both ends of a short shaft 4 disposed vertically to the top end of the inner shaft, and the short shaft 4 is geared with the inner shaft of the support shaft 3 by means of a bevel gear system 5, such that the pair of mold parts $m$ and $m$ are bi-axially rotated around the short shaft 4 and double shaft 3. Rotary rings (not shown) disposed below the turntable 2 are connected and supported to drive drums 6 and 7 mounted on the inner and outer shafts, respectively, such that rotations are given to the outer and inner shafts. Thus, the bi-axial rotation of molds M by the double shaft 3 and the revolution of molds M by the turn table, namely the intermittent rotation of stations in a successive order of station A → station B → station C, can be accomplished.

In this invention, as is illustrated in FIGS. 2 and 3, when the rotation of the mold M around the axis through the support X and the subsequent revolution of the mold M through the station B are combined, since the reinforcer 8a has an apparent density smaller than that of the powdery resin, it floats on the powdery resin. When the amount of the reinforcer 8a incorporated is increased, as is illustrated in FIG. 2a, it is kept in the state napped on the inner surface of the layer of the binder 8b, such as a thermoplastic resin. When the amount of the binder is small, as is illustrated in FIG. 3a, the reinforcer 8a is kept in the state supported by the molten binder 8b. Even when the powdery resin is molten at the station B, since the viscosity of the melt is high and the molten binder is not impregnated into the reinforcer 8a, the reinforcer is not disentangled or solidified in the cotton-like form. Thus, as is illustrated in FIGS. 2a and 3a, the reinforcer 8a in the state napped on the binder layer 8b molten on the inner face of the mold or in the state supported by the binder 8b is sufficiently distributed in each portion of the mold and then, the mold M is cooled at the station C to effect solidification. Then, at the station A, a matrix composed of a thermosetting resin incorporated with a curing agent is fed into the mold M and at the station B rotational molding is conducted such that the resin is distributed on the entire surface, whereby a matrix layer 8c containing the reinforcer 8a is napped or fluffy state such as shown in FIG. 2c is formed, or a layer of the supported reinforcer 8a impregnated with the matrix such as shown in FIG. 3c is formed. Thus, at the station B there is formed an integrated molded article of the reinforcer-incorporated plastic. At the subsequent station C, the so formed molded article is solidified or cured to obtain a complete molded article of the reinforcer-incorporated plastic. The mold M is then returned to the station A and dismantled, and an intended product such as shown in FIG. 2d or 3d is obtained. Reference symbol 9 is given in the drawings to indicate the so obtained product. In the case of the embodiment shown in FIG. 2, as is shown enlarged in FIG. 2d, the reinforcer 8a is contained in both the layer 8b and the layer 8c, and in the case of the embodiment shown in FIG. 3, there is obtained a molded article in which, as is shown enlarged in FIG. 3d, the majority of the reinforcer 8a is incorporated in the thermosetting resin 8c.

This invention will now be illustrated more specifically be reference to Examples.

EXAMPLE 1

This Example illustrates an embodiment where a box-like vessel having a size of 300 × 200 × 150mm and a thickness of 4.5mm is molded according to this invention.

50g of powdery polyethylene and 400g of glass fibers are thrown into a mold, and the mold is rotated for 6 minutes at a temperature maintained at 250° C to form in advance a layer of glass fibers having a great number of fine voids. Then, 1200g of a polyester containing 1.5% of methylethylketone peroixide as a catalyst and 0.3% of cobalt octenoate and dimethylaniline as a promoter is introduced into the mold and the polyester is impregnated into the glass fibers. The mold is rotated at 25° C for 30 minutes to solidify the polyester as a matrix.

The flexural strength of the so formed molded article is found to be 12Kg/mm$^2$, which is about 2 times the flexural strength of a product prepared by the conventional rotational molding method, which has generally a flexural strength of about 6 to 7Kg/mm$^2$.

EXAMPLE 2

A cylindrical vessel having a diameter of 400mm, a length of 700mm and a thickness of 2mm is prepared from 125g of powdery polyethylene as a binder, 1000g of glass fibers as a reinforcer and 3000g of a polyester as a matrix according to the same procedures as adopted in Example 1. The flexural strength of the resulting molded article is found to be 12Kg/mm$^2$.

In addition to materials used in the foregoing Examples, the following materials are preferably employed in practising the method of this invention.

As the binder, there are employed resins having good compatibility and adhesiveness with a resin to be used as the matrix. For instance, in case an unsaturated polyester is used as the matrix, polyethylene, ABS and polystyrene resins are used most preferably.

As the reinforcer, there are preferably used glass fibers in which a liquid matrix can be well impregnated and it can be fully disentangled.

As the matrix, there can be mentioned unsaturated polyesters of the room temperature curing type and the heat curing type, and resins which are in the form of a solid powder at room temperature but liquified and made fluid under heating and then solidified, such as powdery epoxy resins. The matrix is to be used in this invention includes not only polymers (macromolecular materials) but also monomers (for instance, monomers giving such polymers as nylon 6, acrylic resins, urethane prepolymers, phenol resins, polyesters and polystyrene).

According to this invention, as pointed hereinabove, the amount incorporated of the reinforcer can be greatly increased as compared with the case of the conventional rotational molding method. More specifically, more than 30 parts of the reinforcer can be incorporated per 100 parts of the resin (the reinforcer content being more than 23% by weight). Accordingly, in this invention it is possible to improve greatly the mechanical strength in resulting molded articles. Further, the reinforcer is distributed uniformly along the entire inner face of the mold, and it is disentangled in the matrix resin layer. In such state, it is present in both the matrix layer or the binder layer, or the majority of the reinforcer is contained in the matrix layer. As a result of this feature, the mechanical strength is further improved in resulting molded articles.

Still further, the reinforcer is napped on the inner face of the binder layer or supported in the molded state on the inner face of the mold by the binder at the first molding step, and this napped or supported reinforcer is impregnated with the matrix, and disentangled or laminated at the second molding step. Accordingly, the inner surface of the assembly is more smooth and the mechanical strength is increased. The resulting molded article has a smooth inner surface and exhibits excellent surface characteristics.

In the conventional rotational molding method, only when a thermosetting resin of the room temperature curing type is used as the matrix, a viscosity suitable for the molding is attained, and in the case of thermosetting resins of the heat curing type, since the viscosity change is too extreme, molding is impossible. In contrast, according to this invention, since the reinforcer is uniformly dispersed along the entire inner face of the mold and it is napped on the inner face of the binder layer, or supported in the molded state by the binder resin, the matrix can be fixedly retained in the reinforcer even when the viscosity change occurs and in this state the curing is accomplished. Therefore, not only thermosetting resins of the heat curing type can be used in this invention.

Obviously, many modifications and variations of the present invention are possible in light of the above teachings. It is therefore to be understood that within the scope of th appended claims, the invention may be practiced otherwise than as specifically described herein.

What is claimed as new and desired to be secured by Letters Patent of the United States is:

1. A method for preparing reinforcer-incorporated articles by rotational molding, which comprises adding to a rotatable mold a reinforcer and a thermoplastic binder, said thermoplastic binder having an apparent density greater than that of the reinforcer, said thermoplastic binder being added in an amount smaller by weight than the amount of reinforcer but in an amount sufficient to support the reinforcer on the mold wall, heating said mold to a temperature sufficient to melt said thermoplastic binder and rotating said mold to cause said thermoplastic binder to flow along the inner wall of said mold and wherein said reinforcer is caused to at least partially float on said thermoplastic binder due to the said apparent density differential between said reinforcer and said thermoplastic binder and whereby the movement of said reinforcer and said thermoplastic binder causes the formation of a reinforcer layer having a plurality of voids therein, feeding a liquid matrix into the mold so as to impregnate the liquid matrix into the plurality of voids by rotating the mold, and solidifying the matrix impregnated into the voids in the rotary mold to form a hardened matrix, having a reinforcer layer.

2. A method according to claim 1, wherein the matrix is a polymer.

3. A method according to claim 1 wherein the matrix is a monomer.

4. A method according to claim 1 wherein the matrix is a thermosetting resin.

5. A method according to claim 1 wherein the binder is polyethylene, the matrix is an unsaturated polyester, and glass fibers are used as the reinforcer.

6. A method according to claim 1, wherein the reinforcer is one having a flaky form.

7. A method according to claim 1, wherein the binder is fed into the mold in the form of a powder.

8. A method according to claim 1, wherein the binder is applied to a part of the reinforcer in advance outside the mold and is fed into the mold in the state applied to the reinforcer.

* * * * *